United States Patent

[11] 3,633,359

[72] Inventor Calude Leslie Gordon Worn
Cheltenham, England
[21] Appl. No. 6,519
[22] Filed Jan. 28, 1970
[45] Patented Jan. 11, 1972
[73] Assignee Dowty Hydraulic Units Limited
Cheltenham, England
[32] Priority Feb. 18, 1969
[33] Great Britain
[31] 8,688/69

[54] HYDRAULIC APPARATUS
24 Claims, 1 Drawing Fig.
[52] U.S. Cl. .................................................. 60/19,
60/52 SR, 60/53 R
[51] Int. Cl. ............................................ F15b 11/16
[50] Field of Search ........................................ 60/19, 53
R, 53 A, 52 SR

[56] References Cited
UNITED STATES PATENTS
2,874,533 2/1959 Schott .......................... 60/53 A X
3,039,267 6/1962 Voreaux et al. ................ 60/53 A X
3,173,259 3/1965 Harbidge ...................... 60/53 A X Primary Examiner—Edgar W. Geoghegan
Attorney—Young & Thompson ABSTRACT: A hydraulic power transfer system, for use for example in the propulsion of a vehicle, comprising an engine, a fixed positive displacement pump driven by the engine, a fixed positive displacement pump driven by the engine, a variable positive displacement motor, a control valve controlling flow of liquid from the pump to the motor and a pressure responsive means responding to increase in hydraulic pressure at the motor to increase motor displacement and increase engine speed. The variable positive displacement motor may be the propulsion motor for the vehicle. The control valve may include a variable flow-selecting device adapted to feed the motor some of the pressure liquid delivered by the pump and including a bypass to carry the remainder of the liquid carried by the pump back to reservoir. The pressure-responsive means may operate to limit hydraulic pressure to a value which having regard to the volumetric displacement of the pump will demand a driving torque from the engine less than the maximum torque of which the engine is capable.

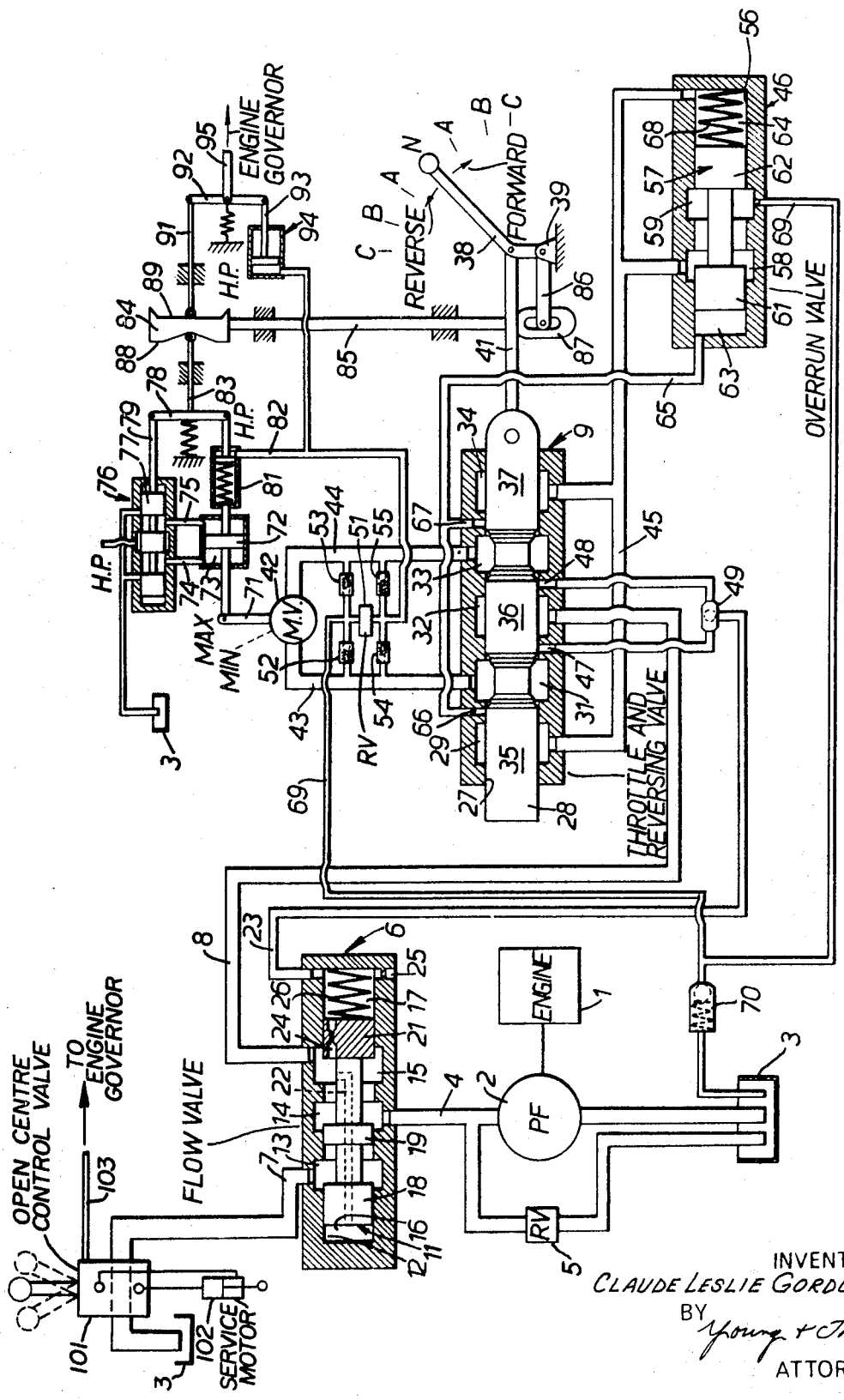

HYDRAULIC APPARATUS

This invention relates to a hydraulic power transfer system comprising an internal combustion engine and a hydraulic power transmission capable of transmitting power to at least one load.

The object of the present invention is to provide a simple power transfer system which avoids the need for a variable positive displacement pump.

In accordance with the present invention a hydraulic power transfer system comprises an engine, a fixed positive displacement pump driven by the engine, a variable positive displacement motor, a connection to carry liquid from the pump to the motor and a pressure-responsive means responding to increase in hydraulic pressure at the motor to increase motor displacement and to increase engine speed.

The pressure-responsive means may operate over the displacement adjustment range of the motor to limit hydraulic motor pressure to a value which, having regard to the volumetric displacement of the pump, will demand a driving torque from the engine less than the maximum torque of which the engine is capable.

At the speed of the engine at which maximum power can be developed, the power required by the pump may be equal to the maximum power available from the engine.

The connection may include a variable flow-selecting device adapted to feed the motor some of the pressure liquid delivered by the pump and a bypass to carry the remainder of the liquid delivered by the pump back to reservoir. The variable flow-selecting device may include a reversing means capable of feeding this liquid flow either in one direction or the other through the motor.

The variable flow-selecting device may include a manual control which is also arranged to adjust engine speed in the sense to increase engine speed with increase in selected flow of liquid from the pump. The manual control may also adjust motor displacement.

The hydraulic power transfer system may include an overrun valve connected in the return line from the motor to throttle return flow from the motor in the event that the motor is driven as a pump.

The variable flow-selecting device may include a manually adjustable throttle valve and a flow valve acting to adjust the selected flow from the pump through the throttle valve to the motor in the sense to maintain or tend to maintain a constant pressure drop at the throttle valve.

The bypass passage may include an open-center service valve adapted to connect the bypass liquid to operate a second motor. The power transfer system may be mounted on a vehicle arranged so that the first mentioned motor is mechanically connected for propulsion of the vehicle, while the second motor may be arranged to operate a service on the vehicle.

One embodiment of the invention will now be particularly described with reference to the accompanying diagrammatic drawing. This embodiment of the invention is intended for use with a loader vehicle, i.e., a self-propelled vehicle including a bucket for lifting material such as earth from ground level up to a higher level.

The vehicle is powered by a single engine 1 preferably of the diesel type having a speed governor capable of adjustment to select any engine speed in a range of power-giving speeds. The engine is directly connected to drive a pressure-loaded gear pump 2, of fixed displacement. The pump 2 draws liquid from a reservoir 3 and delivers it at pressure to a pipe 4. From the pipe 4 a spring-loaded pressure relief valve 5 extends back to the reservoir and will bypass liquid from the delivery pipe 4 in excess of a predetermined pressure. This pressure is calculated having regard to the displacement per revolution of the pump so that the input torque required to drive the pump at any speed in the engine speed range and to raise pressure to the level to open the relief valve is just equal to the maximum engine torque available throughout the speed range.

The pipe 4 passes from the pump 2 into a flow valve 6 and leaves the flow valve through a pair of delivery pipes 7 and 8.

The delivery pipe 7 connects to an open-center control valve 101 which in turn connects to the service motor 102 or motors. In this instance the service motors are piston-and-cylinder devices for operating the loader bucket. The control valve is an open-center control valve which has the property of connecting the flow from the pipe 7 back to reservoir 3 without restriction in the event that a service motor is not operated. When a service motor is to be operated the movement of the valve diverts flow from the pipe 7 into the service motor 102 and this operation will cause the pressure in the pipe 7 to increase. Operation of a service valve is also arranged to increase the speed setting of the engine governor by rod 103. The pipe 8 connects to a combined throttle and reversing valve 9. Within the flow valve 6 a spool valve member 11 is slidably located in a cylinder 12 having three ports 13, 14, and 15 opening into it. The two ends of the cylinder 12 are closed to provide working spaces 16 and 17.

The spool valve 11 has three lands 18, 19, and 21 which cooperate with the ports. The working space 16 is fed with liquid at the pressure in the port 15 through a passage 22 within the spool. The working space 17 is fed with liquid at pressure from a control pipe 23. In the event that no flow is possible through the control pipe 23 the pressure in the working space 17 is controlled by two restrictors 24 and 25 connected in series, the junction of the restrictors being the working space 17. Restrictor 24 extends from the port 15 through land 21 and restrictor 25 extends from working space 17 to reservoir. The working space 17 contains a spring 26 urging the spool 11 to the left as seen in the drawing so that land 19 closes port 13 from port 14. The control pressure liquid fed through pipe 23 is normally lower than the pressure in port 15 so that the effect of the pressure in port 15 acting in working space 16 will normally move the spool to the right against the compression of the spring 26 so that the land 19 moves within the port 14 and forms two restrictive flow paths one from port 14 to port 15 and the other from port 14 to port 13.

The throttle and reversing valve 9 includes a cylinder bore 27 within which a spool valve member 28 is slidable. Five ports 29, 31, 32, 33, and 34 open into the cylinder 27. The spool valve 28 includes three lands 35, 36, and 37, the waisted portions between each adjacent pair of these lands being suitably tapered or slotted to provide a control variation in throttle between the ports depending on the movement of the spool valve member 28. The spool valve member 28 is movable under the control of a manual control lever 38 pivotally mounted at a fixed pivot 39 and connected to the spool valve by the means of a link 41.

The propulsion motor 42 is a variable-displacement tilting head motor arranged to have the largest possible tilting angle. For example it is quite reasonable to arrange the tilting head motor so that its head is capable of movement from a minimum to a maximum displacement. The tilting head motor has a pair of hydraulic connections 43 and 44 which are connected respectively to the ports 31 and 33. The direction of rotation of the motor is reversible and depends on which of the two connections 43 or 44 is fed with liquid at high pressure. Movement of the handle 38 to the right as shown in the drawing will connect high-pressure liquid to port 31 and connection 43 and this will correspond to forward rotation of the motor.

Within the valve 9 the port 32 is directly connected to the pressure pipe 8 and the two outer ports 29 and 34 are connected together by means of pipe 45 to an overrun valve 46. Thus movement of the lever 38 in a forward sense as shown in the drawing will connect port 32 to port 31 and port 33 to port 34. For reverse movement of the handle 38 port 32 will be connected to port 33 and port 29 will be connected to port 31.

The portions of the cylinder 27 in between the ports 31, 32, and 33 are provided with a pair of auxiliary ports 47 and 48. These ports are connected to a shuttle valve 49 which selects the higher pressure and feeds it to the control line 23. When the spool 28 is moved so that the land 36 connects the pressure port 32 to either one or the other of the two ports 31 or 33 one or the other of the two ports 47 or 48 will be connected to receive liquid at pressure from the ports 31 or 33 and this liquid will be fed to the pipe 23 to control the flow valve.

The connections 43 and 44 of the motor 42 are provided in the conventional way with an overrun relief valve 51 connected by means of four bridge-connected nonreturn valves 52, 53, 54, and 55 so that the relief valve always receives the pressure difference between the connections 43 and 44 in one sense and will open to bypass liquid if this pressure difference on overrun becomes excessive.

The overrun valve 46 includes a cylinder bore 56 within which a spool valve member 57 is slidably mounted. A pair of ports 58 and 59 open into the cylinder 56. The spool valve 57 includes a pair of lands 61 and 62. The two ends of the cylinder 56 are closed to define a pair of working spaces 63 and 64. The return flow pipe 45 from valve 9 connects both to the port 58 and to the working space 64. The working space 63 is connected through pipe 65 to a pair of auxiliary ports 66 and 67 located in cylinder 27 of valve 9, the port 66 being located between the two ports 29 and 31 and the port 67 being located between the two ports 33 and 34. The ports 66 and 67 will be closed when the handle 38 is in the neutral position but when the handle is moved from the neutral position will be connected to either of the ports 31 or 33 which receives the return flow from the motor 42. Thus the return flow pressure from motor 42 before passing the adjustable throttle formed by lands on valve 9 to either of the ports 29 or 34 will be fed to the working space 63. The working space 64 contains a control spring 68 urging the spool valve 57 against the higher pressure in working space 63 to throttle the return flow from port 58 into port 59. Spring 68 is of such strength that the throttling action will permit a slightly higher flow rate than is permitted by flow valve 6 to motor 42 for any particular setting of the valve member 28. The port 59 is connected by pipe 69 to the junction of nonreturn valves 52 and 53. A low-pressure relief valve 70 connects pipe 69 to reservoir 3.

The displacement of the motor 42 is adjusted by angular movement of a lever 71 between the two indicated positions shown as "max" and "min." The lever is adjusted by means of a servo piston 72 carried in a servo cylinder 73. The two ends of the servo cylinder are fed with liquid through pipes 74 and 75 by means of a servocontrol valve 76. The control valve 76 is of the conventional type including a three-land spool 77 slidable in a cylinder. The arrangement is such that if the spool valve member 77 is moved to the left high-pressure liquid is connected to pipe 75 and pipe 74 is connected to reservoir and alternatively if the spool 77 is moved to the right high-pressure liquid is connected to pipe 74 and pipe 75 is connected to reservoir. A floating lever 78 is pivotally connected at its end to a rod 79 extending from the spool valve 77 and to a caged spring unit 81 extending from the piston 72. The caged spring unit comprises a piston and cylinder having a single high-pressure connection 82, and a spring in a state of compression which urges the piston to one end of the cylinder so that normally the piston and cylinder form a rigid link between the piston 72 and the floating lever 78. High-pressure liquid is fed to connection 82 for example through a flexible pipe from the junction of valves 54 and 55 to select the propulsion motor pressure, the arrangement being such that if the pressure approaches a predetermined value the caged spring unit 81 will reduce in length so reacting through the floating lever 78 on to the control valve 76 to cause adjustment of motor displacement towards its maximum. The central pivot of the floating lever 78 is carried by a linearly movable link 83 whose endwise position is determined by its engagement with a cam 84. The link 83 forms a cam follower engaging the cam surface 88 of cam 84.

The cam 84 is moved linearly by means of a slidable link 85 extending from a lever extension 86 of the manual lever 38, a lost motion pin and slot connection 87 forming the connection between lever 86 and link 85.

The cam 84 also includes a second cam surface 89 engageable by a cam follower 91. The cam follower 91 pivotally connects to one end of a floating lever 92. The opposite end of the floating lever 92 is pivotally mounted on the connection rod 93 of the spring-loaded piston-and-cylinder unit 94 fed with high pressure from the motor 42 by virtue of the two nonreturn valves 54 and 55. The unit 94 is spring loaded so that lever 92 will move if the motor-operating pressure exceeds a predetermined high value. From the center of the lever 92 a link 95 extends to the speed governor of the engine 1.

In operation assume that it is desired to propel the vehicle forwardly at slow speed. The manual lever 38 is then moved slightly to the right from its neutral position N towards the position A. With the range NA the valve spool 28 will be moved so that land 36 connects port 32 to port 31 in a throttled manner and land 37 connects port 33 to port 34 in a throttled manner. Liquid at pressure from port 32 will then pass through port 31 and connection 43 to the motor 42 which will be at maximum displacement. The flow rate of liquid permitted will depend on the actual movement given to the lever 38. The auxiliary port 47 will detect the pressure from port 31 which will be fed to working space 17 in flow valve 6. The spool 11 of the flow valve will move to the right as seen in the drawing since the working space 16 will receive the slightly higher pressure from port 15 and the land 19 will throttle the pump delivery flow from the port 14 into port 15 to a value which will ensure a substantially fixed small pressure drop between port 32 and 31. The excess of the pump delivery will pass through the bypass 7. Movement of lever 38 in the NA range will not cause movement of link 85 by virtue of the lost motion at pin and slot 87. The cam surface 89 will then maintain the engine governor set at a minimum power-giving speed for the engine. The vehicle will then move at a slow speed as determined by the throttling effect of land 36 on the flow of liquid from port 32 to port 31. This flow rate will remain substantially constant in spite of the fact that the resistance to motion of the vehicle may vary, increase in resistance to motion being accommodated by rise in delivered pressure from pump 2. The rise in pressure at pump 2 will tend to slow the engine but the normal action of the engine governor will increase fuel flow to the engine to tend to prevent reduction of engine speed.

If it is required that the vehicle should move at a faster rate the lever is moved into the range AB. Within the range AB the lost motion at the pin and slot is taken up and the link 85 will be moved in the upward direction as seen in the drawing. This movement will cause movement to the left of the link 83 which in turn will cause movement of the servo valve 76 which will result in movement of the servo piston 72 to reduce the motor displacement from its maximum value towards the minimum value. Since the servomotor 72 will move only in proportion to the movement of the link 83 the actual reduction of motor displacement will depend on the actual position of the lever 38 between the positions A and B. At position B the follower 83 will have reached the highest point of the cam surface 88 and will have reduced motor displacement to the minimum. The vehicle will now be traveling at a moderate speed having regard to the fact that the engine is rotating at its minimum power-giving speed and the majority of the pump delivery from pump 2 passes through the motor 42 in its minimum displacement condition. If a further increase in vehicle speed is now desired the lever 38 is moved into the range BC. In this condition the movement given to the cam 84 by link 85 causes the follower 91 to engage an inclined portion of cam surface 89 which will move the engine governor to increase engine speed. The delivery flow rate of liquid from pump 2 will therefore increase and will be fed to the propulsion motor in its minimum displacement condition to give increased speed to the vehicle. Position C of the lever 38 represents the maximum permissible speed of the engine and minimum displacement of the propulsion motor, the combination giving the maximum vehicle speed. At any position of the lever 38 however, the throttle and reversing valve 9 and flow valve 6 will continue to meter a flow rate of liquid to the motor in accordance with the position of lever 38.

If it is desired to reduce vehicle speed the lever 38 is moved towards the N position. Depending on the actual position of the lever 38 either the engine speed will be reduced, or the motor displacement will be increased or the throttling effect of land 36 will be increased. Any of these actions will tend to reduce motor speed whereby the inertia of the vehicle will drive motor 42 as a pump. The return flow connection 44 from motor 42 will then be at a higher pressure than the connection 43. The return flow from connection 44 passes from port 33 to port 34 and a small throttling effect will occur at land 37. The auxiliary port 67 will pick up the pressure from port 43 and feed it to working space 63 of overrun valve 46. The spool 57 will then move to the right as seen in the drawing against the loading of spring 68 and will restrict the return flow from port 58 to port 59 in the sense to tend to maintain a given pressure drop between the ports 33 and 34. The energy of the vehicle is dissipated for the most part by flowing through the restriction between ports 58 and 59 as adjusted by land 61. Since the load of spring 68 is higher than the load of spring 26 the overrun valve will permit a slightly higher flow rate from motor 42 than is permitted by valve 6 for any particular setting of lever 38. This could tend to cavitate the liquid flow to the motor were it not for the pipe 69 which under these circumstances will carry liquid from overrun valve 69 to the junction of relief valves 52 and 53 allowing this liquid to enter the motor 42 directly. Excess flow from pipe 69 passes through low-pressure relief valve 70 to reservoir 3.

If the vehicle is stationary the land 36 closes the port 32 and no pressure liquid will flow from port 15 through pipe 8. Under these conditions the auxiliary ports 46 and 48 are not connected to the ports 31 and 33 and no control signal is fed through pipe 23 to working space 17. Under these circumstances the series restrictors 24 and 25 exert a controlling effect on the pressure in working space 17 and will determine a portion of the total pressure from port 15 to operate in the working space 17. The full pressure from port 15 of course will act in the working space 16 and spool 11 will be urged to the right substantially to close the flow passage from port 14 to port 15 and to allow an almost uninterrupted flow from port 14 into port 13. From port 13 the flow through pipe 7 is to an open-center control valve for the service motors. If the valve is not operated, i.e., if a service motor is not to be operated, an unrestricted flow path exists through the service valve back to reservoir and the pump 2 will therefore be called upon to generate little pressure. Under these conditions the engine will only need to exert a small driving torque on the pump and there will be a corresponding small consumption of fuel by the engine.

If it is desired to operate the service motor 102 while the vehicle is stationary the open-center service valve 101 will be operated to divert flow from the pipe 7 to the service motor 102, to restrict flow back to reservoir and to increase engine speed by increasing the speed setting of the engine governor through rod 103. Such restriction of flow in the passage 7 will immediately cause the pressure to increase and increase in engine speed will increase flow rate of liquid. After completion of movement of the service motor the service valve will again be returned to the open-center condition reducing pump pressure and engine speed and permitting bypass flow directly from passage 7 to reservoir 3.

Assume now that the vehicle is moving forwardly, the lever 38 being for example in the B-position, i.e., minimum motor displacement and it is desired to operate a service motor 102, e.g., to lift the bucket. Under normal conditions during propulsion the total delivery of the pump 2 passes almost entirely to the propulsion motor 42, the flow valve 6 operating to cause substantial pressure loss of the small proportion of the pump delivery which passes from the port 14 into the port 13 and then through the open-center service valve 101 back to reservoir. The operation of the engine governor by lever 38 is arranged substantially so that the controlled flow to the motor permitted by valve 9 is substantially the full pump delivery at the selected engine speed. When the service valve 101 is operated to cause movement of a service motor 102 there will be an increase in speed setting of the engine governor to increase delivery from the pump and a restriction in the flow through the passage 7 in valve 101 which will tend to cause a greater flow through the propulsion motor 42. This extra flow is detected at the port 47 as a greater pressure loss and therefore the pressure in the working space 17 will fall so that pressure in the working space 16 will urge spool 11 to the right as seen in the drawing to further restrict the flow from port 14 to port 15 but to reduce restriction in the flow from port 14 to port 13 and also to raise the pressure of the now increased liquid flow to the pipe 7 and to the service motor 102. The greater the pressure required by the service motor the greater the restriction to flow through the passage 7 in valve 101 and therefore the greater the increase in pump pressure to increase flow to the service motor. This increase in pump pressure also tries to increase flow to the propulsion motor which will cause reduction in pressure in the working space 17 which in turn causes movement of the spool 11 further to restrict flow to the motor 42 and to reduce restriction to the service motor. The tapered form of the throttling edges of the lands 35, 36, and 37 is such that even in the position of maximum vehicle speed, i.e., position C of lever 38 some throttling will take place at the edges of the lands 35, 36, and 37 which will provide appropriate control pressures in the working spaces 17 and 63 of the flow valve and the overrun valve. The design of the engine 1, the pump 2 and propulsion motor 42 are preferably such that for normal vehicle speeds and resistance to motion the full power of the engine is not required and the engine is capable of some increase in speed to maximum to operate the service motors. Under extreme conditions if there is substantial resistance to motion the high pressure supplied to propulsion motor 42 will rise to a high level and this pressure fed to the caged spring unit 81 can cause contraction of this unit to cause an overriding increase in motor displacement even though the lever 38 is between positions B and C which corresponds to minimum motor displacement. This operation will prevent the high propulsion motor pressure from rising to a value which causes the pump to demand a higher torque than the engine can supply and incidentally will prevent excessive loading of the transmission motor.

The spring-loaded piston and cylinder unit 94 responds to the same high level of pressure as the caged spring unit 81 and in the condition where the caged spring unit 81 increases motor displacement there will be a simultaneous movement of the spring-loaded piston and cylinder unit 94 to increase the speed setting of the engine governor. Thus any reduction in propulsion speed which might result from contraction of the caged spring unit 81 as the result of excessive pressure will be compensated at least in part by an increase in engine speed resulting in increase in liquid flow rate delivered to the motor 42.

If during propulsion of the vehicle the driver needs to brake the vehicle quickly he will move the control lever 38 very quickly back to the N-position. This action will suddenly close the two ports 31 and 33 cutting off flow of liquid in the pipes 8 and 45. Under these circumstances the relief valve 51 will operate to pass liquid pumped by the motor 42 at quite high pressure thus causing a substantial deceleration of the vehicle. Under extreme emergency conditions the driver might be tempted to obtain emergency braking by moving the lever 38 for propulsion in the opposite sense, e.g., if the vehicle is going forwardly he might move the lever 38 for reverse propulsion. This operation due to the inertia of the vehicle will cause the motor to pump liquid into the pipe 8 in opposition to the delivery flow from the pipe 2. However this flow of liquid from the motor 42 will cause a pressure signal to be fed to pipe 23 of pressure greater than the pressure in the port 15 so that the spool 11 will move quickly to the left as seen in the drawing, land 21 completely closing the port 15. The high-pressure liquid generated in the motor 42 must then pass through the relief valve 51. However it will be seen that moving the lever 38 into the opposite sense of propulsion will not offer any greater degree of deceleration of the vehicle than merely moving the lever to the neutral position. The spool 11 will restore itself to its normal position as soon as the vehicle has come to a halt and the braking pressure developed in motor 42 reduces to zero.

During operation of the described embodiment it is essential that the engine should always be capable of acceleration, other than when it is operating at maximum power or maximum torque. The maximum power which the pump 2 may obtain is matched to the maximum power of the engine having regard to pump displacement, speed, and operating pressure. Any tendency of the pump to require more power when operating at maximum power will appear as an increase in pump pressure and the resulting increase in pump-driving torque will reduce engine speed to a value where more torque is available. However due to reduction of engine speed the power will have reduced. The setting of relief valve 5 is such that pump pressure cannot rise above the value corresponding to maximum engine torque.

In the description reference has only been given to propulsion of the vehicle in the forward direction. It will be appreciated that the propulsion of the vehicle in the reverse direction is equally possible by moving the lever 38 to the left as shown in the drawing and that the steps in operation corresponding to positions A, B, and C are equally applicable in reverse propulsion.

In the described embodiment of the invention which is intended for use with a loader vehicle the priority of demand for liquid at pressure from the pump 2 is given to the propulsion motor by operation of the flow valve 6, i.e., the selected flow of pressure liquid to the motor 42 as determined by the control lever 38 will be provided in preference to flow to the service motors. It is within the scope of the present invention that priority of flow from the pump 2 could be to the service motors, the propulsion motor only being arranged to use flow from the pump surplus to the demand of the service motors. A vehicle in which priority of flow to the service motors is necessary is a forklift truck where priority of flow must be given to the service motor operating to lift or lower the fork.

It is within the scope of the present invention to modify the described embodiment by providing a means to limit the flow rate to the propulsion motor to a proportion of the total pump delivery flow. This arrangement will be necessary in a vehicle such as a combine harvester in which the power to propel the vehicle is only a proportion of the power available and a service motor or motors use a part or all of the remaining power available from the engine.

In the described embodiment the relief valve 5 responds merely to the delivery pressure from the pump 2 and will bypass pump delivery flow merely to prevent the pressure in pipe 4 from exceeding a predetermined value. It is within the scope of the present invention to provide means which will respond to the flow of liquid through the relief valve to reduce the governor speed setting of the engine. This arrangement will prevent operation of the engine at an unnecessarily high speed with consequent loss of power and will tend to ensure that the flow rate delivered by the pump 2 is just sufficient to supply the demand to the propulsion motor and the service motors.

The open-center control valves 101 which control the service motors 102 as previously stated are interconnected by rod 103 with the engine speed governor in such a way that operation of an open-center valve to operate a service motor will cause a speed increase in the engine governor setting. In this way the extra flow rate of liquid required when a service motor is selected for operation is provided by increasing speed of the engine. Where there are a plurality of service motors and open-center valves to control them, an adding device may be provided which totals the movements given to the various open-center valves for feeding to the engine governor. The resulting increase in speed setting of the engine governor may be arranged to depend either on the number of operated open-center valves or the total movement given to all open-center valves.

In the described embodiment the propulsion motor 42 is a tilting head motor which has the advantage of offering a large range of displacement adjustment over which efficient motor operation is possible. It is within the scope of the present invention to use any alternative form of positive-displacement motor for the propulsion motor. For example the propulsion motor may be a swashplate motor of the kind having a rotary cylinder block connected to the motor drive shaft and pistons extending from cylinders in the block which engage a tiltable swashplate. Such a swashplate motor offers the advantage that the drive shaft may extend completely through the motor thus facilitating different forms of propulsion for the vehicle. For example the drive shaft may at one end be connected to rotate the vehicle ground wheels and at the other end the shaft may be connected through a clutch to the engine crankshaft. In this way when it is required to propel the vehicle at high speed without the necessity for operation of a service motor, the clutch may be engaged and the propulsion motor may be hydraulically disconnected so that the engine power may pass directly through the motor shaft to propel the vehicle, no hydraulic propulsion then being necessary.

The described embodiment provides the relief valve 5 operative at one pressure setting to limit pump-driving power. It is however within the scope of this invention for the pressure setting of the relief valve to be variable in such manner that the pump-driving power may more closely approach the power available from the engine at differing speeds within the engine speed range, for example the setting of the relief valve may be adjusted in accordance with engine speed.

I claim:

1. A hydraulic power transfer system comprising an engine, a fixed positive-displacement pump driven by the engine, a variable positive-displacement motor, a connection to carry liquid from the pump to the motor, and a pressure-responsive means responding to increase in hydraulic pressure at the motor to increase motor displacement and to increase engine speed.

2. A hydraulic power transfer system as claimed in claim 1 wherein the pressure responsive means operates over the displacement adjustment range of the motor to limit hydraulic motor pressure to a value which having regard to the volumetric displacement of the pump will demand a driving torque from the engine less than the maximum torque of which the engine is capable.

3. A hydraulic power transfer system as claimed in claim 1 wherein at the speed of the engine at which maximum power can be developed the power required by the pump is equal to the maximum power available from the engine.

4. A hydraulic power transfer system as claimed in claim 1 wherein the connection includes a variable flow-selecting device adapted to feed the motor some of the pressure liquid delivered by the pump, and a bypass to carry the remainder of the liquid delivered by the pump back to reservoir.

5. A hydraulic power transfer system as claimed in claim 4 wherein the variable flow-selecting device includes a reversing means capable of feeding the selected liquid flow either in one direction or the other through the motor.

6. A hydraulic power transfer system as claimed in claim 4 wherein the variable flow-selecting device includes a manual control which is also arranged to adjust engine speed in the sense to increase engine speed with increase in selected flow of liquid from the pump.

7. A hydraulic power transfer system as claimed in claim 6 wherein the manual control is also arranged to adjust motor displacement.

8. A hydraulic power transfer system as claimed in claim 1 including an overrun valve connected in the return line from the motor to throttle return flow from the motor in the event that the motor is driven as a pump.

9. A hydraulic power transfer system as claimed in claim 4 wherein the variable flow-selecting device includes a manually adjustable throttle valve and a flow valve acting to adjust the selected flow from the pump through the throttle valve to the motor in the sense to maintain or tend to maintain a constant pressure drop at the throttle valve.

10. A hydraulic power transfer system as claimed in claim 4 wherein the bypass passage includes an open-center service valve adapted to connect the bypass liquid to operate a second motor.

11. A hydraulic power transfer system as claimed in claim 10 including a pressure relief valve for the pump to limit pump delivery pressure to a value corresponding to the maximum torque of which the engine is capable.

12. A hydraulic power transfer system as claimed in claim 10 wherein the open-center service valve is mechanically connected to the engine speed control so as to increase engine speed when the bypass is connected to operate the second motor.

13. A hydraulic power transfer system comprising an engine, a fixed positive-displacement pump driven by the engine, a variable positive-displacement motor, a connection to carry liquid at pressure from the pump to the motor, a service control valve, a service motor selectively fed with liquid at pressure from said service valve, a bypass valve connected to carry liquid at pressure from said connection to said service control valve, and means responsive to flow demand from said service control valve to said bypass valve to increase engine speed.

14. A hydraulic power transfer system as claimed in claim 13, including a variable flow-selecting device located in said connection between the bypass valve and the variable-displacement motor to selectively adjust flow to the variable-displacement motor by adjustment of the bypass valve to control bypass flow.

15. A hydraulic power transfer system as claimed in claim 14, wherein the service control valve is of the open-center type which permits the bypass to flow therethrough to a low-pressure zone when the service motor is inoperative and diverts such bypass flow to the service motor when operation thereof is selected.

16. A hydraulic power transfer system as claimed in claim 14, wherein the flow-selecting device is a manually variable throttle and the bypass valve includes spring loading and hydraulic working spaces connected to the flow-selecting device and arranged to adjust bypass flow in the sense to maintain a constant pressure drop at the flow-selecting device.

17. A hydraulic power transfer system as claimed in claim 15, wherein the flow-selecting device is a manually variable throttle and the bypass valve includes spring loading and hydraulic working spaces connected to the flow-selecting device and arranged to adjust bypass flow in the sense to maintain a constant pressure drop at the flow-selecting device.

18. A hydraulic power transfer system as claimed in claim 14, wherein the variable flow-selecting device includes porting to enable the connection to the variable displacement motor to be in the forward and reverse senses.

19. A hydraulic power transfer system as claimed in claim 15, wherein the variable flow-selecting device includes porting to enable the connection to the variable displacement motor to be in the forward and reverse senses.

20. A hydraulic power transfer system as claimed in claim 16, wherein the variable flow-selecting device includes porting to enable the connection to the variable displacement motor to be in the forward and reverse senses.

21. A hydraulic power transfer system as claimed in claim 17, wherein the variable flow-selecting device includes porting to enable the connection to the variable-displacement motor to be in the forward and reverse senses.

22. A hydraulic power transmission comprising a pump, a first hydraulic motor, a second hydraulic motor, a main variable throttle connecting the pump delivery to the first motor, a bypass variable throttle controlling flow from the pump delivery to the second motor, means for adjusting said bypass throttle comprising a cylinder, a piston in the cylinder to define two working spaces connected one to either side of the main throttle, spring loading acting to urge the piston and the bypass throttle oppositely to the resultant hydraulic force generated in the working spaces such that the bypass throttle is adjusted in the sense to tend to maintain a constant pressure drop across the main throttle.

23. A hydraulic power transmission as claimed in claim 22, wherein the bypass throttle is connected in series with the main throttle and the second motor is connected to pump delivery upstream of the bypass throttle.

24. A hydraulic power transmission as claimed in claim 22, including a slide valve device having forward and reverse main variable throttles selectable by movement into forward and reverse positions, forward and reverse first motor connections connected to said forward and reverse variable throttles, a pair of auxiliary ports opened and closed during slide valve movement and connected both to one working space of the bypass throttle such that the one working space is connected alternatively to the forward and reverse first motor connections in dependence on adjustment of the slide valve to open the forward or reverse main throttles.

* * * * *